Patented Dec. 7, 1937

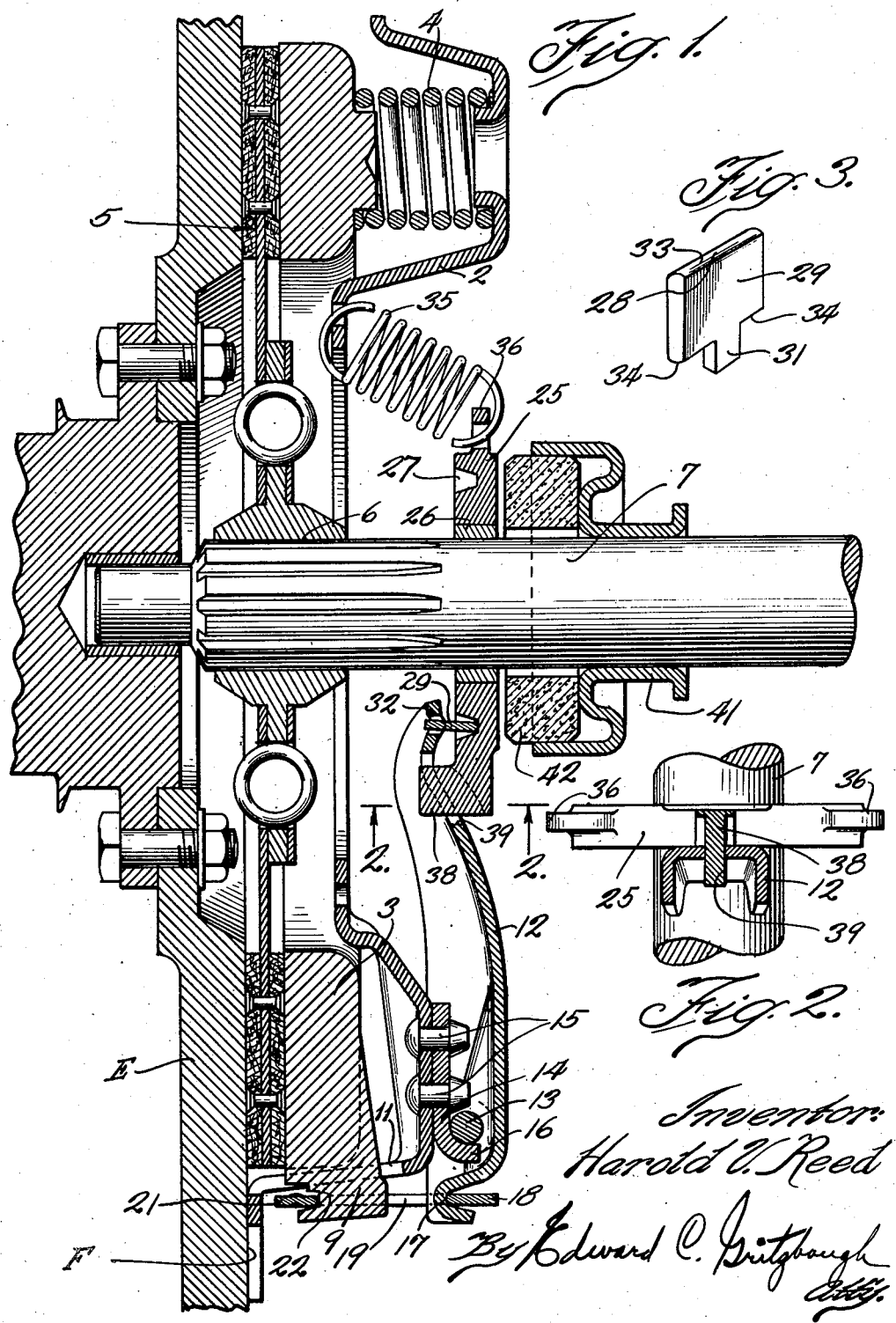

2,101,293

UNITED STATES PATENT OFFICE 2,101,293

FRICTION CLUTCH

Harold V. Reed, Chicago, Ill., assignor to Borg-Warner Corporation, Chicago, Ill., a corporation of Illinois Application January 22, 1936, Serial No. 60,156

6 Claims. (Cl. 192—68)

This invention relates to improvements in friction clutches and more particularly to improvements in the clutch release lever and lever operating assembly thereof.

An object of the invention is to provide in a friction clutch an improved release lever and lever operating assembly having a novel anti-friction connection between the release levers and the lever operating ring.

Another object is to provide an improved clutch release lever operating assembly in which the operating ring is held yieldingly in operative position relative to the release levers, thereby to permit the use of an independently mounted thrust sleeve for working engagement with the operating ring. This feature facilitates the use of a so-called "graphite" bearing between the operating ring and the sleeve to minimize friction between the ring and sleeve assembly during release and engagement of the clutch.

A further object is to provide an improved release lever operating assembly which is simple in construction, which may be readily assembled and disassembled for replacement or repair, and which may be manufactured at relatively low cost.

Other objects, the advantages and uses of the invention will become apparent after reading the following specification and claims, and after consideration of the drawing forming a part of the specification, wherein:

Fig. 1 is a vertical sectional view of a motor vehicle friction clutch embodying the features of the invention;

Fig. 2 is a sectional view along the line 2—2 of Fig. 1, and

Fig. 3 is a perspective view of a part of the lever operating assembly illustrated in Fig. 1.

I have selected for illustration herein a friction clutch of the type adapted for use in a motor vehicle to provide a releasable driving connection between the engine and the transmission shafts thereof. With reference to Figure 1, the clutch may include a steel cover plate 2 adapted to be secured to the adjacent face F of the engine flywheel assembly E. Mounted within the cover plate 2 is an annular pressure plate 3. The pressure plate 3 is maintained under the influence of a plurality of compression springs 4 interposed between the inner face of the cover plate 2 and the rearward side of the pressure plate 3, tending to urge the pressure plate toward the flywheel of the vehicle.

A driven clutch disc assembly 5, splined at 6 upon the transmission shaft 7 of the vehicle, may be interposed between the pressure plate 3 and the surface F, and normally maintained in driving engagement with the opposed faces of the pressure plate and engine flywheel under the influence of the springs 4. The clutch disc assembly 5 may comprise an assembly such as that illustrated in United States Patent No. 2,028,951. A plurality of lugs 9 may be formed upon the peripheral wall of the pressure plate 3, and may extend through openings 11 in the cover plate 2, the lugs 9 and openings 11 being so proportioned as to preclude relative rotational movement between the pressure plate and the cover assembly. In the present clutch the use of three lugs 9 is contemplated spaced at equal distances one from another.

Clutch release levers 12 may be provided, one for each of the lugs 9. Each of the levers 12 may be pivotally mounted upon the cover plate 2 through the medium of a pivot roller 13 interposed between the lever 12 and a bearing plate 14 fixed by rivets 15 to the rearward face of the cover plate. The outermost of the rivets 15 may serve as a stop to prevent lateral movement of the pivot roller 13. Movement of the roller in the opposite direction may be limited by upturning a flange 16 on the adjacent end of the bearing plate 14.

The outermost end of each lever may be formed with a curved socket 17 within which one end 18 of a tension link 19 is seated. The opposite end 21 of the link may bear upon the inner wall of a recess 22 formed in the lug 9. Movement of the opposite end of the lever 12 toward the cover plate will result in a lifting action upon the pressure plate 3 against the force of the springs 4 to release the clutch. In order to minimize friction in the linkage 19, I prefer to form the edges of the link which engage with the curved socket 17 and the recess 22 with a relatively acute curvature, thereby to induce a rocking or rolling action between the link and the lever and lug respectively.

An operating ring 25, which may be formed of cast iron, and if desired provided with a bearing bushing 26, is mounted for movement along the axis of the transmission shaft 7. The operating ring 25 may have an annular groove 27 formed therein on its inner face to receive one end 28 of each of a plurality of struts 29 (see Fig. 3). The opposite ends of the struts 29 may be of reduced cross sectional contour as indicated at 31, and projected within openings 32 formed through the inner ends of the levers 12. I prefer to form the end walls 33 and 34 of the struts 29 with a cylindrical curvature, as indicated in Fig. 3, to establish a rolling contact between the struts and the operating ring 25 and levers 12.

Three tension springs 35 may be fixed to the cover plate 2 each at one end, and may have their opposite ends engaged with lugs 36 formed on the operating ring 25 between the points of engagement of the operating ring with the struts 29. The springs 35 function yieldingly to urge the operating ring 25 toward the levers, thus to maintain the parts of the operating assembly in operating relationship one with another.

In order that there may be no relative rotation between the operating ring 25 and the levers 12, driving lugs 38 may be formed integrally with the operating ring 25 (see Fig. 2) and each may extend into a suitable opening 39 formed in the adjacent lever 12.

The operating ring 25 may be moved toward the cover plate 2 for release movement of the lever 12 through the medium of a sleeve 41 mounted for movement along the axis of the transmission shaft 7, the sleeve 41 having at its forward end a graphite bearing block 42 constructed in a manner well known in the art.

I have provided in the clutch structure herein described a clutch release lever operating assembly in which all rubbing or sliding action between the operating ring and the clutch release levers during operation thereof is eliminated, the connection between the operating ring and levers being such as to present high anti-friction characteristics. The parts of the assembly are maintained constantly in operative position independently of the position of the operating sleeve or its mechanical counterpart through which thrust is imparted to the operating ring 25. The construction employed is extremely simple in nature, permitting the parts readily to be assembled and disassembled for replacement or repair, although the likelihood of necessity for replacement through wear is remote due to the anti-friction engagement between the several moving parts of the assembly.

While I have illustrated and described but one embodiment of my invention herein, it will be apparent that the improved features of the assembly may be incorporated in many other structural embodiments without departing from the spirit and scope of the invention as particularly defined in the claims.

I claim:

1. In a friction clutch, a spring-urged pressure plate, a pressure plate release lever mounted for pivotal movement, means connecting one end of said lever with said pressure plate, a lever operating ring mounted for movement along the axis of rotation of said pressure plate, a strut interposed between the opposite end of said lever and said operating ring, said strut having a reduced portion of angular cross-section received in an opening of similar cross-section in said lever thereby to restrain said strut from lateral movement relative to said lever, and means restraining said ring against rotational movement relative to said lever.

2. In a friction clutch, a spring-urged pressure plate, a pressure plate release lever mounted for pivotal movement, means connecting one end of said lever with said pressure plate, a lever operating ring mounted for movement along the axis of rotation of said pressure plate, a strut interposed between the opposite end of said lever and said operating ring, and a drive lug carried by said operating ring engaging said lever adjacent to its engagement with said strut.

3. In a friction clutch, a spring-urged pressure plate, a pressure plate release lever mounted for pivotal and bodily longitudinal movement during operation, a member pivotally connected at one end to said lever and at its opposite end to said pressure plate, a lever operating ring mounted for movement along the axis of rotation of said pressure plate, spring means acting on said ring to urge said ring toward said lever, and a force-transmitting member interposed between the opposite end of said lever and said operating ring, and means restraining said ring against rotational movement relative to said lever, said force-transmitting member having a rocking contact with said lever and with said ring.

4. In a friction clutch, a spring-urged pressure plate, a pressure plate release lever mounted for pivotal movement, means connecting one end of said lever with said pressure plate, a lever operating ring mounted for movement along the axis of rotation of said pressure plate, a strut interposed between the opposite end of said lever and said operating ring, said strut having a rocking contact with said lever and with said ring, and a drive lug formed on said ring extending into an opening formed in said lever to restrain said ring from rotating relative to said lever.

5. In a friction clutch, a pressure plate, spring means acting on said plate, a plurality of pivoted levers, means connecting one end of each lever with said pressure plate, a lever operating ring mounted for movement toward and away from the opposite ends of said levers, a groove formed in said ring on that side facing the levers, and a plurality of struts, one for each lever, each strut having one end received in said groove and the opposite end thereof engaged with the adjacent end of the adjacent lever.

6. In a friction clutch, a spring urged pressure plate, a pressure plate release lever mounted for pivotal movement, means pivotally connected to one end of said lever and to said pressure plate for transmitting motion from said lever to said pressure plate, a lever operating ring mounted for movement along the axis of rotation of said pressure plate and transversely of the longitudinal axis of said lever, spring means urging said ring toward the free end of said lever, and a member floatingly mounted between said ring and the free end of said lever and adapted for rocking engagement with said ring and said lever, thereby to transmit force from said ring to said free end of said lever, said floatingly mounted member being retained in place between the ring and lever by inter-engaging portions maintained in contact by the influence of said spring means.

HAROLD V. REED.